United States Patent [19]

Waymouth

[11] Patent Number: 5,104,956
[45] Date of Patent: Apr. 14, 1992

[54] STEREOREGULAR CYCLOPOLYMERS AND METHOD

[75] Inventor: Robert M. Waymouth, Palo Alto, Calif.

[73] Assignee: Board of Trustees of the Leland Stanford Junior Univ., Stanford, Calif.

[21] Appl. No.: 452,721

[22] Filed: Dec. 19, 1989

[51] Int. Cl.$^5$ ............................................. C08F 36/20
[52] U.S. Cl. ..................................... 526/336; 526/160; 526/308; 526/335; 526/340.2; 526/340.3; 502/117
[58] Field of Search ...................... 526/336, 308, 340.2, 526/340.3; 502/117

[56] References Cited

U.S. PATENT DOCUMENTS 3,357,961 12/1967 Makowski .......................... 260/94.2
3,435,020 3/1969 Olson .
4,360,551 11/1982 Guarino ................................ 428/35
4,391,738 7/1983 Langer ............................. 252/429 B
4,931,526 6/1990 Yoshitake et al. ................... 526/336

FOREIGN PATENT DOCUMENTS

0284707A1 10/1988 European Pat. Off. .
1358103 3/1989 European Pat. Off. .

OTHER PUBLICATIONS

Cheng, H. N. and Khasat, N. P., "13 C-NMR Characterization of Poly (1,5-Hexadiene)," J. Appl. Pol. Sci., vol. 35, 1988, pp. 825-829.
Arcus, "The Stereoisomerism of Addition Polymers. Part I. The Stereochemistry of Addition and Configurations of Maxiumum Order", J. Amer. Chem. Soc., 1955, pp. 2801-2806.
Marvel and Stille, "Intermolecular Intramolecular Polymerization of α-Olefins by Metal Alkyl Coordination Catalysts", J. Am. Chem. Soc., vol. 80, Apr.-Jun. 1958, pp. 1740-1744.
Makowski et al., "1,5-Hexadiene Polymers, I. Structure and Properties of Poly-1,5-Hexadiene", J. Polymer Sci.: Part A, vol. 2, 1964, pp. 1549-1566.
Schleyer et al., "The Evaluation of Strain in Hydrocarbons. The Strain in Admantane and Its Origin", J. Am. Chem. Soc., vol. 92, No. 8, Apr. 22, 1970, pp. 2377-2386.
Ewen, "Mechanisms of Stereochemical Control in Propylene Polymerizations with Soluble Group 4B Metallocene/Methylalumoxane Catalysts", J. Am Chem. Soc., vol. 106, 1984, pp. 6355-6364.
Kaminsky et al., "Polymerization of Propene and Butene with a Chiral Zirocene and Methylalumoxane as Catalyst", Angew, Chem. Int. Ed. Engl., vol. 24, No. 6, 1985, pp. 507-508.
Farina, "The Stereochemistry of Linear Macromolecules", Top. Stereochem., vol. 17, 1987, pp. 1-111.
Cheng and Khasat, "13 C-NMR Characterization of Poly (1,5-hexadiene)", J. Appl. Polymer Sci., vol. 35, 1988, pp. 825-829.
Ewen et al., "Syndiospecific Propylene Polymerizations with Group 4 Metallocenes", J. Am. Chem. Soc., vol. 110, 1988, pp. 6255-6256.

Primary Examiner—Joseph L. Schofer
Assistant Examiner—Fred Zitomer
Attorney, Agent, or Firm—Majestic, Parsons, Siebert & Hsue

[57] ABSTRACT

Homogeneous catalyst systems are provided for cyclopolymerization of diolefins, particularly 1,5-hexadiene, which control the stereochemistry, microstructure, and physical properties of the polymers synthesized. The systems comprise homogeneous Ziegler-Natta catalysts based on group 4 metallocenes and methylalumoxane. The cyclopolymers synthesized exhibit different degrees of stereoregularity, which is a function of the polymerization conditions. In addition, the polyolefins can be chiral and optically active. The polymers produced are of high molecular weight and highly flexible.

4 Claims, No Drawings

STEREOREGULAR CYCLOPOLYMERS AND METHOD

FIELD OF THE INVENTION

The present invention relates to high molecular weight stereoregular cyclopolymers and particularly to catalyst systems for cyclopolymerization of non-conjugated diolefins.

BACKGROUND OF THE INVENTION

Cyclopolymerization of 1,5-hexadiene was first reported by Marvel and Stille, and further investigated by Makowski. See Marvel, C.S. et al. "Intermolecular-Intramolecular Polymerization of α-Olefins by Metal Alkyl Coordination Catalysts", *J. Am. Chem. Soc.*, 1958, 80, 1970 and Makowski, H.S. et al., "1,5-Hexadiene Polymers, I., Structure and Properties of Poly 1-5 Hexadiene", *J. Polymer Sci., Part A*, 1964, 2, 1549. Both studies utilized heterogeneous Ziegler-Natta catalysts which promote a special type of addition polymerization referred to as coordination polymerization. Marvel and Makowski both reported low activities and incomplete cyclization of the diolefin. More recently, Cheng reported that cyclo-polymerization of 1,5-hexadiene using a catalyst system of diethylaluminum chloride and titanium trichloride. $^{13}$C-NMR analysis of the resulting polymer indicated complete cyclization and an approximate 1:1 ratio of tran- and cis-fused cyclopentane rings in the polymer. Cheng et al., "$^{13}$C-NMR Characterization of Poly(1,5-hexadiene)", *J. Appl. Polym. Sci.*, 1988, 35, 825.

One of the special features of Ziegler-Natta catalysts is the stereochemistry associated with polymerization. Radical- and cationic-chain polymerization of mono-substituted olefins lead to products having random stereochemical configuration, referred to as atactic polymers. Regular stereoisomers are possible, and some Ziegler-Natta catalysts promote formation of stereoregular polymers. Isotactic polymers of α-olefins are those having the same stereochemistry at each asymmetric carbon and syndiotactic polymers are those where the configuration alternates regularly down the chain. For instance, Ziegler-Natta catalysts have produced isotactic, syndiotactic and atactic polypropylenes.

Bis(cyclopentadienyl) bis(phenyl) titanium/methylalumoxane was reported as the first homogeneous catalyst system to influence and control the stereochemistry of propylene polymerization. Ewen, J.A., "Mechanisms of Stereochemical Control in Propylene Polymerizations with Soluble Group 4B Metallocene/Methylalumoxane Catalysts", *J. Am. Chem. Soc.*, 1984, 106, 6355. More recently, it was reported that homogeneous zirconium catalysts produced isotactic polypropylene and polybutene. Kaminsky, W., et al., "Polymerization of Propene and Butene with a Chiral Zirconocene and Methylalumoxane as Cocatalyst", *Angew. Chem. Int. Ed. Engl.*, 1985, 24, 507.

SUMMARY OF THE INVENTION

It is an object of the present invention to provide homogeneous catalyst systems for cyclopolymerization of diolefins particularly 1,5-hexadiene, which control the stereochemistry, microstructure, and therefore the physical properties of the polymers synthesized.

It is a further object of the present invention to provide polymers that have a combination of useful physical properties: high flexibility combined with high strength and crystallinity.

It is a further object of this invention to prepare chiral and optically active polyolefins. Unlike polypropylene, the cyclopolymers of the invention are chiral.

These and other objects are provided by the present invention.

In one aspect of the present invention, polymeric compounds are provided having the structure

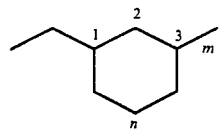

where $C_1$, $C_2$, and $C_3$ designate respectively the first, second, and third carbon in the ring of each monomer moiety, where n is an integer from 0 to about 3 and m is an integer between about 1 and 10,000, and where the substituents to $C_1$ and $C_3$ are predominately in the trans or cis position.

These compounds are generally of high molecular weight, highly flexible and durable. These compounds, in particular those where the substituents to $C_1$ and $C_3$ are trans, are chiral and can be made optically active through selection of optically active catalyst precursors.

In another aspect of the invention, catalyst systems for the cyclopolymerization of non-conjugated diolefins into high molecular weight stereoregular polymers are provided. One system consists of a catalyst system for the cyclopolymerization of non-conjugated diolefins including diallyldimethylsilane into high molecular weight polymers comprising: (a) an achiral metallocene derivative $(C_5R'_5)_2MX_2$, where $(C_5R'_5)$ is a substituted or nonsubstituted cyclopentadienyl ligand, R' is a hydrogen or a hydrocarbyl substituent, M is Hf, Ti, or Zr, and where X is any uni-negative ligand including a halide, hydrocarbyl, alkoxide or amide; and (b) an aluminum compound.

The second system consists of a catalyst system for the cyclopolymerization of non-conjugated diolefins including diallydimethylsilane into high molecular weight polymers comprising: (a) a chiral stereorigid metallocene described by the formula:

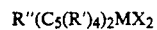

wherein $(C_5(R')_4)$ is a cyclopentadienyl or substituted cyclopentadienyl ring, including indenyl and tetrahydroindenyl rings; each R' is a hydrogen or hydrocarbyl radical having from 1 to 20 carbon atoms; R" is an organic or inorganic group providing a structural bridge between the two $(C_5(R')_4)$ rings imparting stereorigidity to the said catalyst; M is Zr, Hf, or Ti; and X is any uni-negative ligand including a halide, hydrocarbyl, alkoxide or amide; and (b) an aluminum compound.

In another further aspect of the invention, a method for preparing high molecular weight stereoregular cyclopolymers from non-conjugated diolefins is provided. The method consists of promoting and controlling cyclopolymerization by use of the said catalyst systems and regulating the temperature and other parameters of the reaction. The method can be employed to produce either the atactic or isotactic forms of the inventive compound in trans or cis configuration with varying degrees of stereoregularity.

DETAILED DESCRIPTION OF PREFERRED EMBODIMENTS

Compounds in accordance with the invention have the structure illustrated in Formula I, below.

FORMULA I

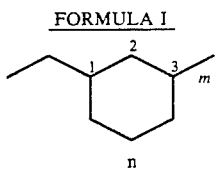

where $C_1$, $C_2$, and $C_3$ designate respectively the first, second, and third carbon in the ring of each monomer moiety, where n is an integer from 0 to about 3 and m is an integer between about 1 and about 10,000, and where the substituents to $C_1$ and $C_3$ are predominately in the trans or cis position.

As is apparent, $C_1$ and $C_3$ of each repeating unit of the polymer are chiral centers and the polymers, in contrast to stereoregular poly-α-olefins, are chiral polymers. The inventive compounds can be prepared with a range of molecular weights with oligomers as low as m = 1, to high polymers with m > 10,000, m also referred to as the degree of polymerization. In addition, as will be further described below, the compounds are stereoregular with respect to the cis-trans relationship $C_1$ and $C_3$ in the repeating units, as well as with regard to the relative stereochemistry between the carbocyclic rings. Furthermore, the inventive compound polymers are either predominately atactic or isotactic.

The compounds are derived from the cyclopolymerization of diolefins. The overall reaction from initial reactants to formation of the desired cyclopolymer is generally illustrated by Reaction Scheme I below.

REACTION SCHEME I

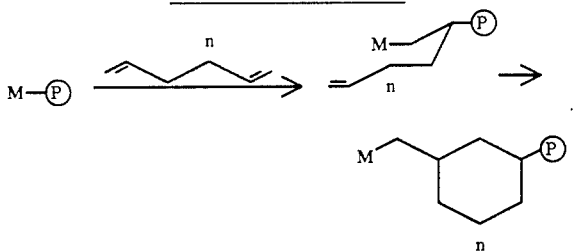

As is apparent, there is a direct relationship between the length of the diolefin reactant and the size of the ring in the cyclopolymer. Thus, 1,5-hexadiene, where n=0, produces cyclopentane; 1,6-heptadiene, where n=1, produces cyclohexane; and so forth. In addition, by utilizing substituted diolefins reactant, cyclopolymers with substituted rings are produced. As an example, 3-methyl-1,5-hexadiene has been cyclopolymerized into cyclomethylpentane with the methyl attached to the $C_4$ or $C_5$ of the pentane ring. Furthermore, it is contemplated that heterocyclic polymers are possible. For instance, diallydimethysilane is expected to form poly(1,3-methylene-5,5-dimethylsilacyclohexane).

The inventive compounds are synthesized by utilizing either of two novel catalyst systems, as will now be described. The first system consists essentially of a catalyst for the cyclopolymerization of non-conjugated diolefins including diallyldimethylsilane into high molecular weight polymers comprising: (a) an achiral metallocene derivative $(C_5R'_5)_2MX_2$, where $(C_5R'_5)$ is a substituted or nonsubstituted cyclopentadienyl ligand, R' is hydrogen or a hydrocarbyl substituent, M is Hf, Ti, or Zr, and where X is any uni-negative ligand including a halide, hydrocarbyl, alkoxide or amide; and (b) an aluminum compound. The second system consists essentially of a catalyst system for the cyclopolymerization of non-conjugated diolefins including diallydimethylsilane into high molecular weight polymers comprising: (a) a chiral stereorigid metallocene described by the formula:

$$R''(C_5(R')_4)_2MX_2$$

wherein $(C_5(R')_4)$ is a cyclopentadienyl or substituted cyclopentadienyl ring, including indenyl and tetrahydroindenyl rings; each R' is a hydrogen or hydrocarbyl radical having from 1 to 20 carbon atoms; R'' is an organic or inorganic group providing a structural bridge between the two $(C_5(R')_4)$ rings imparting stereorigidity to the said catalyst; M is Zr, Hf, or Ti; and X is any uni-negative ligand including a halide, hydrocarbyl, alkoxide or amide; and (b) an aluminum compound.

In general, a variety of techniques to carry out polymerization are known. Two such techniques were employed to synthesize the inventive compounds. In one method, referred to as bulk polymerization, prescribed amounts of diolefin reactants and catalysts were mixed whereas in the slow monomer addition method, reactant was added slowly over a period of time. The bulk and slow addition techniques are described in greater detail in Method I and Method II below.

The specific parameters and conditions under which Methods I and II were applied are set forth in Table I below as well as are the results from the analysis of the polymers formed.

METHOD I

In a 100 ml schlenk with stirring bar was placed 1,5-hexadiene and the system thermostatted at the desired temperature by an external cooling-heating bath. The metallocene was weighed in a NMR tube, transferred into a 10 ml schlenk, and methylalumoxane added: a lemon-yellow $Cp_2ZrMe_2$ or yellow-orange $EBIZrCl_2$ gel was obtained. After 5 minutes aging, the desired amount of catalyst was transferred into the schlenk containing the diolefin, with vigorous stirring. The polymerization was stopped with $CH_3OH$, the polymer washed with $HCl/CH_3OH$ and then $CH_3OH$, filtered and dried overnight at 0.02 Torr. With this procedure, conversions were quantitative, but temperature control was impossible and the resulting polymer was poorly soluble in $CDCl_3$.

METHOD II

In a three-neck 250 ml round bottomed flask equipped with stopcock, stirring bar and dropping funnel with side arm were placed 50 ml toluene, the system brought to the polymerization temperature and the catalyst added. With vigorous stirring, a solution of 5 ml 1,5-hexadiene in 50 ml toluene was added dropwise over 30 minutes. The mixture was allowed to stir for an addition 30 minutes, then quenched with 2 ml $CH_3OH$ and stirred until no more gas evolution was observed.

The volatiles were removed in vacuo at 50° C. and checked by gas chromatography. Only the peaks due to CH₃OH, hexadiene and toluene were observed. Conversions were obtained both by polymer weighing and gas chromatography. The polymers were isolated as in the procedure set forth in Method I. The polymers can be fractionated by boiling solvent extraction in the usual manner.

oligomers (Dp=17). Although the propagation rate of 1,6-heptadiene is expected to be slightly lower than that of 1,5-hexadiene, the lower molecular weight in this case is consistent with the lower strain energy of methylenecyclohexane (1.0 kcal/mol) relative to methylenecyclopentane (6.3 kcal/mol). See Schleyer et al., "The Evaluation of Strain Energy in Hydrocarbons. The Strain of Adamantane and Its Origin", *J. Am. Chem. Soc.*, 1970, 98, 2377.

TABLE I

| Run # | Metallocene | μ mol | Cyclopolymerization of 1,5-hexadiene | | | | | Method |
|---|---|---|---|---|---|---|---|---|
| | | | Al/Mt | T(°C.) | Toluene (ml) | Conversion (%) | Trans (%)(a) | |
| 1 | Cp₂ZrCl₂ | 4.8 | 2300 | 21 | 100 | 11.1 | 80 | II |
| 2 | Cp₂ZrMe₂ | 14.3 | 1300 | 22(b) | — | ~100.0 | 78(c) | I |
| 3 | Cp₂ZrMe₂ | 4.8 | 2400 | 22 | 100 | 25.0 | 83 | II |
| 4(d) | Cp₂ZrMe₂ | 6.7 | 2500 | 0 | 100 | 56.0 | 89 | II |
| 5(e) | Cp₂ZrMe₂ | 14.3 | 1300 | −78 | 50 | 0.6 | 95 | (f) |
| 6 | EBIZrCl₂ | 4.8 | 2400 | 22 | 100 | 81.4 | 64 | II |
| 7 | EBIZrCl₂ | 3.2 | 3000 | 55 | 100 | 98.0 | 61 | II |

Conditions: 1,5-hexadiene 5 ml, polymerization time 1 hour.
(a)From C₄,₅ c/t ratio
(b)temperature runaway ~5'
(c)CHCL₃ soluble fraction
(d)4 hours, 30'
(e)7 hours
(f)catalyst added to the toluene/monomer solution at −78° C.

Results and Analysis

Presented in Table I are results for the cyclopolymerization of 1,5-hexadiene in the presence of catalysts derived from Cp₂ZrX₂ or EBIZrX₂ derivatives (Cp=cyclopentadienyl, X=Cl, Me; EBI=ethylenebisindenyl) and methylalumoxane. Mehtylalumoxane (avg. mol. wt.: 1,400 g/mol) was obtained from Sherex as a 30% solution in toluene and was used as received. Cyclopolymerization of 1,5-hexadiene in toluene solution with catalysts systems containing Cp₂ZrCl₂ or Cp₂ZrMe₂ proceeded with conversions of 11 and 25% after 1 hour to give a high molecular weight solid polymer. H-NMR analysis yielded no detectable end groups. Resonances corresponding to uncyclized monomer units were barely detectable by ¹H or ¹³C-NMR; thus, under these conditions, greater than 99% cyclization had taken place. Polymerization in bulk monomer (Method I) proceeded with 100% conversion after 1 hour; in this case, a fraction of the polymer was insoluble in chloroform, suggesting that some crosslinking may have occurred. However, the chloroform soluble fractions contained no detectable uncyclized monomer units in the polymer.

By way of comparison, polymerization of 1-hexene under the same conditions with Cp₂ZrMe₂ proceeded with similar conversion of monomer but yielded only low molecular weight oligomers (Dp=6). The molecular weight of the oligmers was determined by end group analysis using ¹H-NMR. Thus, under similar conditions, 1,5-hexadiene produces a much higher molecular weight polymer than 1-hexene. Since molecular weight is determined by the relative rates of propagation and termination and similar conversions were obtained with both monomers, the higher molecular weight can be attributed to a lower termination rate in the polymerization of 1,5-hexadiene. A possible origin of this result is the strain energy of the methylene cyclopentane endgroups relative to 1,1-disubstituted olefin endgroups. If the rate of β-hydrogen elimination is sensitive to the strain energy of the liberated olefin, then lower termination rates for the cyclopolymerization might be expected. Consistent with this analysis, cyclopolymerization of 1,6-heptadiene with Cp₂ZrMe₂ yielded only

Stereochemistry

Catalyst assisted cyclopolymerization of 1,5-hexadiene is depicted in Formula II.

FORMULA II

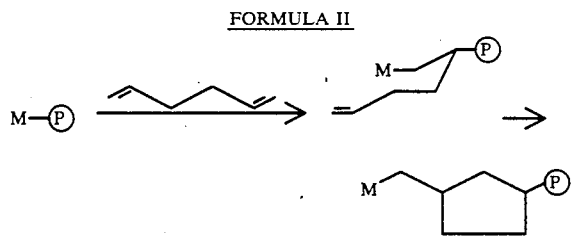

Formula III represents an atactic cyclopentane polymer and Formula IV represents an isotactic cyclopentane polymer formed by the reaction as shown in Formula II.

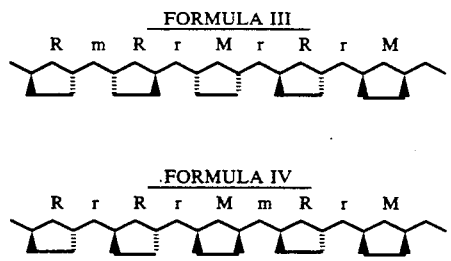

For these polymers, a new notation is used to identify their stereochemistry. This system is based on the common mr formalism for vinyl polymers, where capital letters refer to relative stereochemistry within the ring and lower-case letters refer to relative stereochemistry between the rings. M(m) refers to a meso stereochemical relationship between vicinal stereogenic centers and R(r) refers to a racemic relationship.

In the presence of the achiral metallocene derivatives Cp₂MX₂ (M=Zr, Hf; X=Cl, Me), an unprecedented trans selectivity is observed in the cyclopolymerization of 1,5-hexadiene. This trans selectivity is temperature dependent. At a polymerization temperature of 80° C., $^{13}$C-NMR analysis indicates that there is a 1:1 ratio between trans and cis five-membered rings. At a polymerization temperature of 25° C., approximately 80% of the cyclopentane rings in the polymer are trans. Polymerization at −80° C. afforded the first example of polymethylene-trans-1,3-cyclopentane (95% trans by $^{13}$C-NMR). The $^{13}$C-NMR spectra of these polymers allow confirmation of the $^{13}$C-NMR assignments of Cheng, supra, and provide considerable additional information on the microstructure of these polymers. In particular, the $^{13}$C resonance at 38.5 ppm, assigned to $C_2$ of the five-membered ring, exhibits fine structure which can be attributed to mRm, mRr, and rRr tetrads. Resonances at 33.1 and 31.6 ppm appear as two peaks in equal ratios which are assigned as the mR, rR and rM, mM triads, respectively. According to this analysis, the microstructure of this polymer is assigned as the trans, atactic polymer. The trans selectivity in the presence of the achiral catalyst is attributable to an unfavorable steric interaction between the growing polymer chain and one Cp ring when a Re-Re or Si-Si sequence of insertion-cyclization occurs. For the formation of the cis ring, the polymer chain is forced into the Cp ligands; for the formation of the trans ring, the polymer chain is directed away from the Cp ligands.

Polymerization of 1,5-hexadiene in toluene in the presence of the chiral precursor ·EBIZrCl$_2$ proceeds with much higher conversion of the monomer after one hour to give a high molecular weight solid polymer. This catalyst exhibits lower trans selectivity (64% trans at 22° C.; 61% at 50° C.) but proceeds at a greater rate than the achiral metallocene derivatives Cp$_2$ZrX$_2$. $^{13}$C-NMR analysis is consistent with an isotactic structure (for the cyclopolymer, tacticity refers to the relative stereochemistry of the cyclopentane rings, not necessarily the relative stereochemistry of adjacent substituents). The isotactic structure was as expected for this isospecific catalyst given that polymerization of propylene with the isospecific catalyst EBIZrCl$_2$ produces isotactic polypropylene. In particular, $^{13}$C resonances at 33.1 (mR, rR) and 31.6 (rM, mM) now appear as two peaks in unequal ratios. The presence of these peaks, and their relative intensities, is consistent with an isotactic 60% trans/40% cis microstructure.

The lower trans selectivity in the presence of EBIZrCl$_2$ is attributable to competitive double diastereodifferentiation in the cyclopolymerization. These catalysis are isospecific; they favor polymerization of the same enantioface of the olefin. For a diolefin, isospecificity should favor a cis ring fusion. Thus, for the isospecific EBIZrCl$_2$ catalysts, the inherent diastereoselectivity of the cyclization reaction should favor a trans ring fusion whereas the isospecificity of the coordination sites should favor a cis ring fusion. These two competing factors could thus explain the lower trans selectivity.

It is to be understood that while the invention has been described above in conjunction with preferred specific embodiments, the description and examples are intended to illustrate and not limit the scope of the invention, which is defined by the scope of the appended claims.

It is claimed:

1. A polymer formed of monomer moieties, substantially each monomer having the following structural formula:

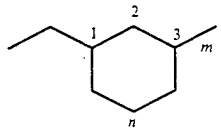

where $C_1$, $C_2$, and $C_3$ designate respectively the first, second, and third carbon in the ring of each monomer moiety, where n is an integer from 0 to about 3 and m is a positive number up to about 100,000, and where the substituents to $C_1$ and $C_3$ are predominately in the trans position.

2. The polymer as defined in claim 1 wherein between 50 to 90 percent of the substituents to $C_1$ and $C_3$ are in the trans position.

3. The polymer as defined in either claim 1 or 2 wherein the polymer is predominately atactic.

4. The polymer as defined in either claim 1 or 2 wherein the polymer is chiral.

* * * * *

UNITED STATES PATENT AND TRADEMARK OFFICE
CERTIFICATE OF CORRECTION

PATENT NO. : 5,104,956
DATED : APRIL 14, 1992
INVENTOR(S) : ROBERT M. WAYMOUTH

It is certified that error appears in the above-identified patent and that said Letters Patent is hereby corrected as shown below:

Column 8, line 25-31 in claim 1

Column 2, lines 10-16 in Summary

Column 3, lines 10-15 in Embodiments

Add missing parenthesis on polymer structure
(See below figure)

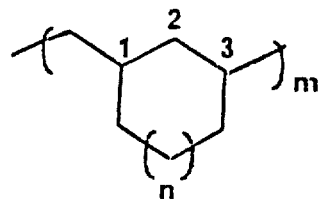

Signed and Sealed this

Twenty-first Day of September, 1993

Attest:

BRUCE LEHMAN

Attesting Officer

Commissioner of Patents and Trademarks